S. GOLDNER.
COMBINED BRACKET AND FASTENER.
APPLICATION FILED DEC. 6, 1919.
1,386,468.
Patented Aug. 2, 1921.
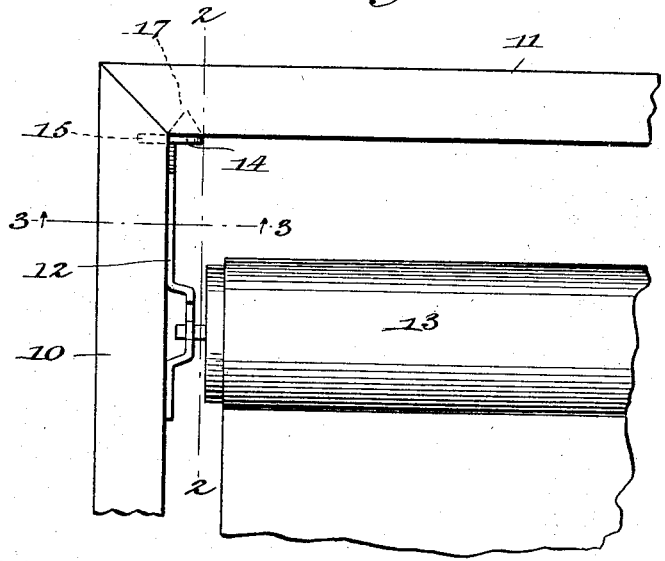
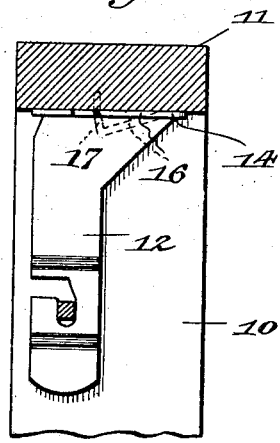
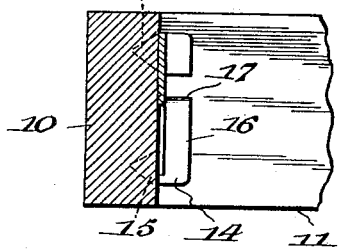
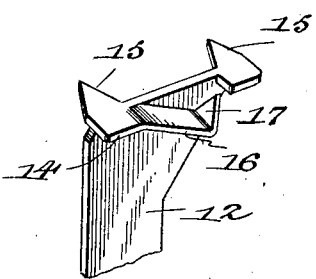
INVENTOR
Simon Goldner
BY
Victor J. Evans
ATTORNEY
WITNESSES:—

UNITED STATES PATENT OFFICE.

SIMON GOLDNER, OF NEW YORK, N. Y.

COMBINED BRACKET AND FASTENER.

1,386,468.     Specification of Letters Patent.     Patented Aug. 2, 1921.

Application filed December 6, 1919. Serial No. 342,917.

*To all whom it may concern:*

Be it known that I, SIMON GOLDNER, a citizen of the United States, residing at New York, in the county of New York and State of New York, have invented new and useful Improvements in Combined Brackets and Fasteners, of which the following is a specification.

This invention relates to brackets and particularly to a means for fastening the same within a corner.

Some of the principal objects and advantages sought to be obtained by this invention are: to provide a bracket having means for securing the same within a corner constituting a part of the same in order to eliminate the necessity of employing separate fastening elements; to provide fastening means for securing a bracket within a corner which includes a primary positioning spur and a secondary spur, the latter bendable with relation to the former and capable of assuming a position for locking the primary spur against displacement; to provide a bracket for use in connection with angularly connected surfaces which comprises a body member provided with fastenings adapted to penetrate the surfaces at the juncture thereof and a second fastening extending at an angle to the first fastening and adapted to penetrate the adjacent surface beyond its juncture with the other surface; to provide means especially adaptable to secure a shade bracket to the inner corner of a window frame which includes spurs formed on said bracket adapted to be projected into adjacent sides of said corner, certain of said spurs being normally bent to lie within the plane of the path of projection of the other spurs and capable of being projected beyond said plane after the other spurs have been positioned; to provide means for securing a shade roller bracket within the corner of a window frame which includes entering and attaching spurs disposed at right angles with relation to each other and adapted to be successively driven into the frame, certain of said spurs normally bent to lie within the confines of said bracket and adapted to be projected outwardly to coact with the frame and serve as a locking means to prevent displacement of the remaining spurs; and to provide a simple and effective attaching means of the class described which may be formed from a single strip of material, cut and bent upon itself to accomplish the foregoing objects.

With these and other objects in view, which will be more expressly set forth in the following description and claims, reference is made to the accompanying drawings constituting a part of this application and in which:

Figure 1 is a fragmentary view of a window frame, showing the invention in its applied position.

Fig. 2 is a sectional view on the line 2—2 of Fig. 1 looking in the direction indicated by the arrows.

Fig. 3 is a similar view on the line 3—3 of Fig. 2.

Fig. 4 is a fragmentary perspective view of the bracket removed from the window frame.

Referring to the drawings by characters of reference which denote like parts throughout the several views of the drawing, 10 designates the side rail of a window frame and 11 the top rail which together form a right angle. The invention includes a bracket 12 which may be of any construction and which is provided with suitable means for supporting a shade roller 13. The upper extremity of the bracket is bent at a right angle to its main body portion and said right angular portion forms a flange 14 from which are projected spurs 15 disposed at the opposite side of the body portion of the bracket to that from which the flange projects, said spurs are pointed in order that they may readily enter the frame. The flange 14 is slitted to provide a bendable tongue 16, the free extremity of which is disposed at an angle with respect to the major portion of its length and said free extremity is pointed to provide a locking spur 17. The tongue 16 is normally bent downwardly to dispose the point of the spur below the upper surface of the flange for a purpose to be hereafter set forth. In applying the device to the window frame the spurs 15 are first driven into the frame immediately at the juncture of the side rail with the top rail, said spurs penetrating the miter joint which is usually found at this point. It will be noted that the inner side of the tongue in its normal position, lies in close contact with the body portion of the bracket and serves as a surface against which the blows of a hammer or other driving tool may be received to drive the primary spurs 15 home. The upper surface of the flange 14 serves as a means for positioning the spurs 15 properly prior to their introduction into the miter joint formed at the juncture of the side and top rails. When the primary positioning studs have been driven into their full extent, the secondary or locking spur 17 is then driven into the top rail by striking under the tongue 16 until it is flush with the remainder of the flange 14. Thus two sets of tongues operate to prevent displacement of the bracket and at the same time do not mar the window frame to any great extent should it be found necessary to remove the bracket. In order to remove the bracket a screw-driver or similar tool may be inserted between the tongue and the top rail 11 to withdraw the spur 17 therefrom and allow for the removal of the primary spurs.

While the fastening means has been illustrated and described as used in connection with shade roller brackets, it is understood that the same is merely illustrative of one use of which the invention may be adapted and it is further understood that no limitation is made to the precise structural details but the right to make changes which fall within the scope of the claims is reserved.

What is claimed as new is:

1. In a shade roller bracket means for securing the same to the corner of a window frame including entering spurs relatively disposed at right angles to each other, and adapted to be successively driven into the window frame, certain of said spurs normally lying within the confines of said bracket and adapted to be projected outwardly to co-act with the frame and serve as a locking means for preventing displacement of the remaining spurs.

2. In a means for attaching shade roller brackets to a window frame, the combination with said bracket, of a flange bent at a right angle thereto, primary entering and positioning spurs formed on said flange and disposed to project from the bracket opposite to the side at which the flange is disposed, a portion slitted from said flange and bent upwardly at its free end to form a secondary entering and locking spur, said position being normally flexed downwardly to cause the point of said locking spur to lie slightly below the horizontal plane of the upper surface of the flange.

In testimony whereof I have affixed my signature.

SIMON GOLDNER.